United States Patent [19]
Michael

[11] Patent Number: 5,743,497
[45] Date of Patent: Apr. 28, 1998

[54] WIRE INSTALLATION STRIP

[76] Inventor: Douglas C. Michael, 03953 County Rd. M-50, Edon, Ohio 43518

[21] Appl. No.: 600,757

[22] Filed: Feb. 13, 1996

[51] Int. Cl.$^6$ .................................................. F16L 3/22
[52] U.S. Cl. .................... 248/68.1; 248/74.2; 248/316.7
[58] Field of Search ........................ 248/49, 68.1, 74.1, 248/74.2, 316.7; 211/60.1

[56] References Cited

U.S. PATENT DOCUMENTS

| | | | |
|---|---|---|---|
| D. 361,259 | 8/1995 | LoJacono, Jr. | |
| 2,082,099 | 6/1937 | Cruser | 248/49 |
| 2,896,887 | 7/1959 | Beltz | 248/68.1 |
| 2,913,740 | 11/1959 | Eldridge | |
| 3,363,864 | 1/1968 | Olgreen | 248/68.1 |
| 3,399,852 | 9/1968 | Armstrong | 248/49 |
| 3,491,971 | 1/1970 | Fisher | 248/74.2 X |
| 3,861,015 | 1/1975 | Hooven | 248/74.2 X |
| 4,039,744 | 8/1977 | Seaquist | |
| 4,244,544 | 1/1981 | Kornat | 248/68.1 |
| 4,440,374 | 4/1984 | Achille | 248/74.2 X |
| 4,705,244 | 11/1987 | Satome et al. | 248/68.1 |
| 4,763,867 | 8/1988 | Hungerford, Jr. | 248/316.7 X |
| 5,056,747 | 10/1991 | Kireta | 248/74.2 X |
| 5,067,677 | 11/1991 | Miceli | 248/68.1 |
| 5,077,646 | 12/1991 | Parsons | 248/74.2 X |
| 5,277,006 | 1/1994 | Ruster | 248/68.1 X |
| 5,398,476 | 3/1995 | Knight | 248/68.1 X |

FOREIGN PATENT DOCUMENTS 2551339  3/1985  France ............................ 248/316.7

*Primary Examiner*—Derek J. Berger
*Attorney, Agent, or Firm*—Brinks Hofer Gilson & Lione

[57] ABSTRACT

A wire installation strip for installing electrical wire which may be mounted to a supporting structural element to speed the installation of the electrical wire. The wire installation strip includes a base and a plurality of retention hooks to retain the electrical wire. Each retention hook includes a first leg extending upwardly from the base, a second leg extending over from the first leg, and a detent angled downwardly from the second leg to capture and retain the electrical wire. The second leg is spaced from the base a selected distance to define an opening having a central axis and provide a gap corresponding to approximately the thickness of the electrical wire. The central axes of the opening of each retention hook are positioned generally parallel to one another.

16 Claims, 2 Drawing Sheets

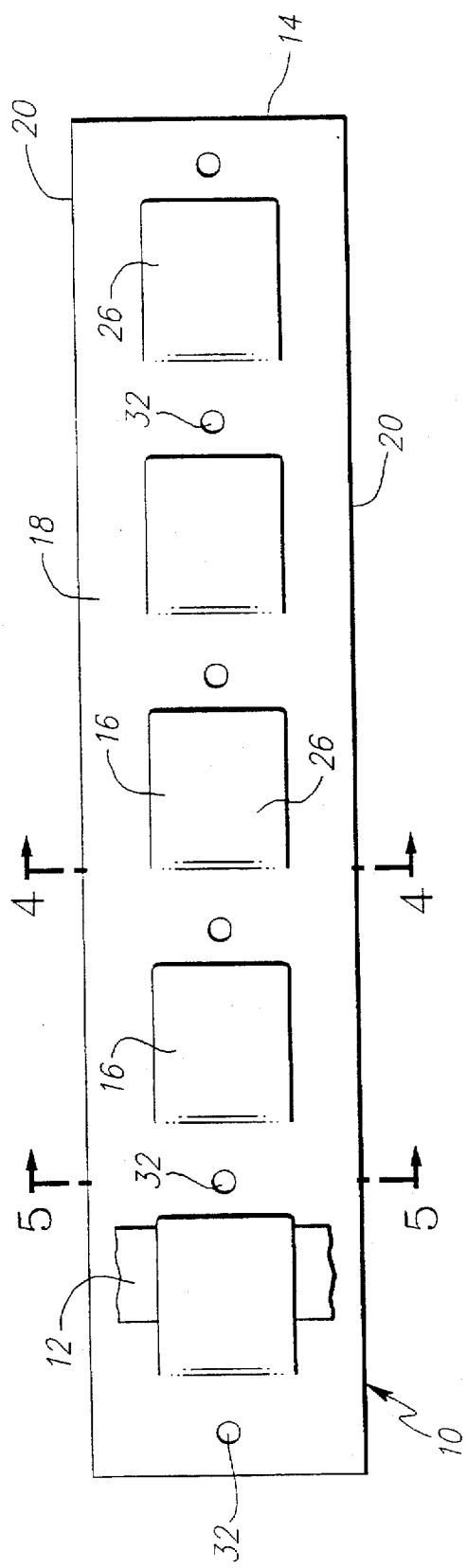
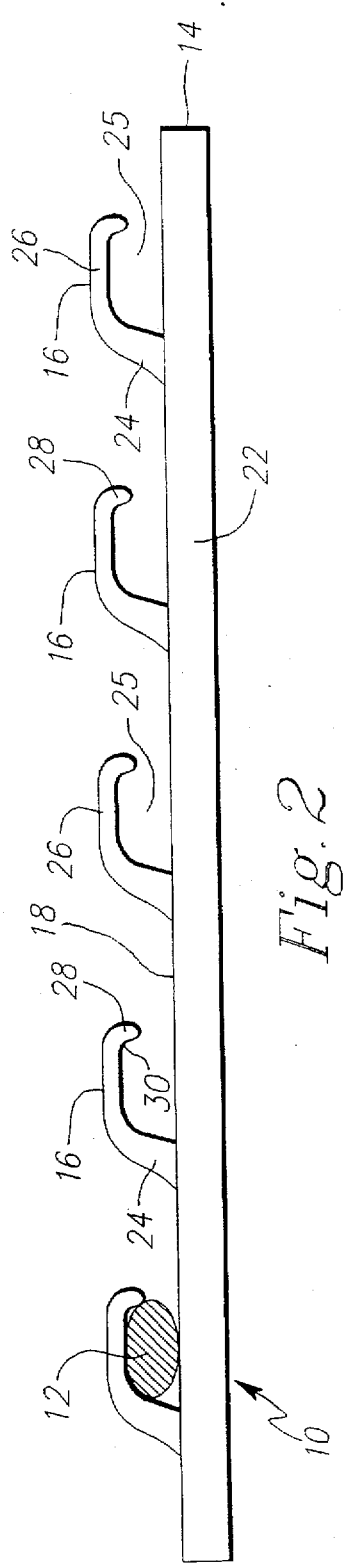
Fig. 1
Fig. 2

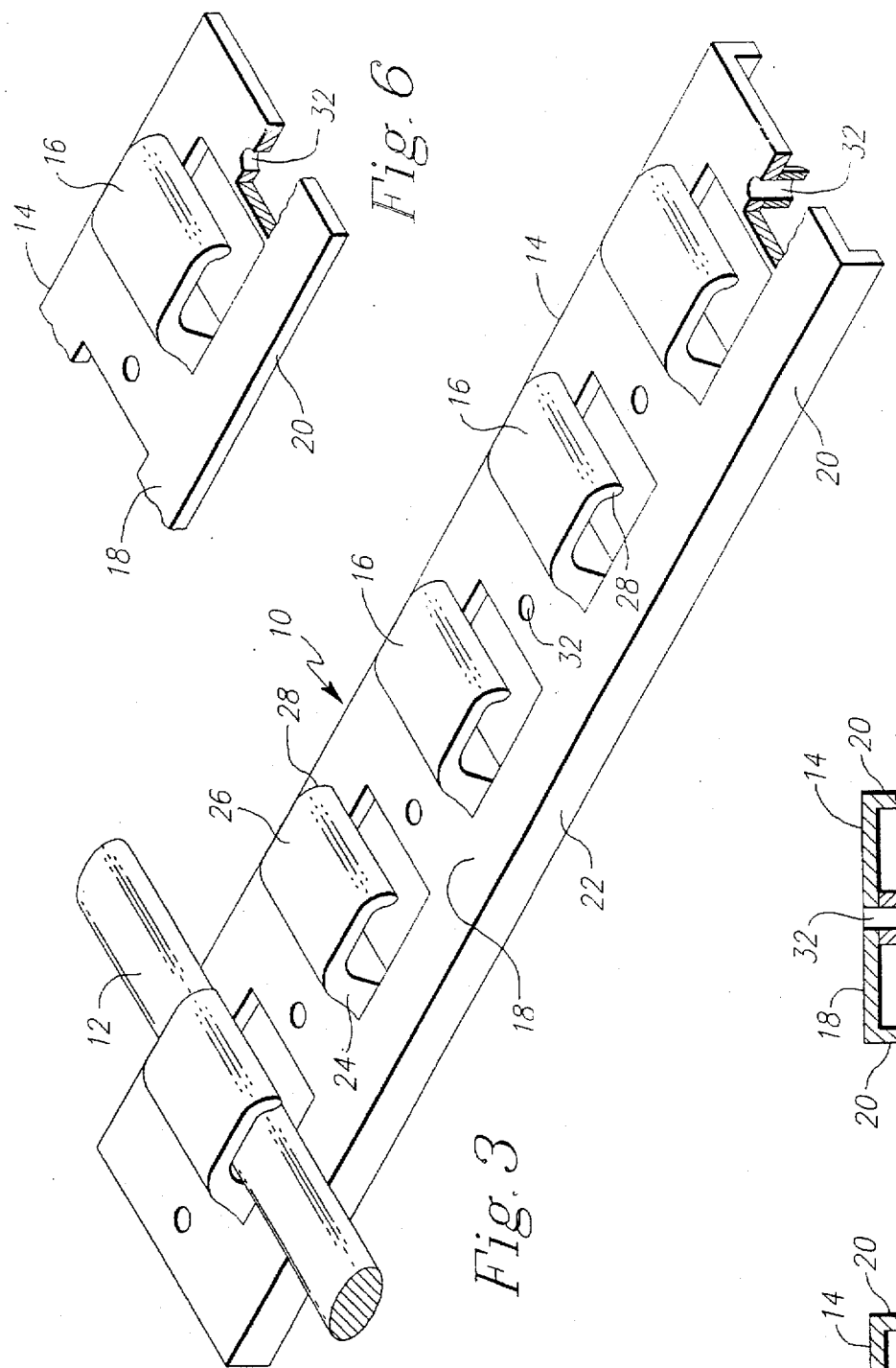

WIRE INSTALLATION STRIP

FIELD OF THE INVENTION

The present invention relates to a wire installation strip. More particularly, this invention relates to a one-piece wire installation strip which may be mounted to a supporting structural element to speed the installation of electrical wire.

BACKGROUND OF THE INVENTION

During installation of typical insulated electrical wiring from a distribution box to various outlets and the like, the electrical wire is typically first strung across joists or cross members and then fastened to the joists or cross members as the wire is strung. Each electrical wire is separately fastened to the joists or cross members using an individual wire fastener of a type well known in the art. One example of a wire fastener may described as including a saddle shaped support having a nail member at opposing ends of the support member. The electrical wire is fit within the corresponding saddled shaped support member and then the support member is fastened against the joists or cross members by the nails. The installation of the individual wire fasteners is a time consuming task and requires that each electrical wire and wire fastener be positioned in place and then the wire fastener nailed before proceeding to the installation of the next section of electrical wire. It will be appreciated that heretofore the installation of electrical wiring is a labor intensive task that requires the use both hands or more than one person.

An object of the present invention is to provide a wire installation strip that is light as to weight. Another object of the present invention is to provide a wire installation strip that is simple and inexpensive as to construction. Yet another object of the present invention is to provide a wire installation strip that is designed so that a plurality of electrical wires or like members may be quickly and easily secured therein in a compact group either before or after the mounting of the wire installation strip on a supporting structural element.

BRIEF DESCRIPTION OF THE DRAWINGS

Further features and other objects and advantages of this invention will become clear from the following detailed description made with reference to the drawings in which:

FIG. 1 is a top view of the wire installation strip in accordance with the present invention;

FIG. 2 is a side view of the wire installation strip of FIG.1;

FIG. 3 is an isometric view of the wire installation strip of FIG.1;

FIG. 4 is a cross-sectional view of the wire installation strip of FIG.1 taken along line 4—4;

FIG. 5 is a cross-sectional view of the wire installation strip of FIG.1 taken along line 5—5; and FIG.6 is a partial isometric view of a wire installation strip in accordance with the present invention.

SUMMARY OF THE INVENTION

Briefly, according to this invention there is provided a wire installation strip for installing electrical wire which may be mounted to a supporting structural element to speed the installation of the electrical wire. The wire installation strip includes a base and a plurality of retention hooks to retain the electrical wire. Each retention hook includes a first leg extending upwardly from the base, a second leg extending over from the first leg, and a detent angled downwardly from the second leg to capture and retain the electrical wire against the first leg. The second leg is spaced from the base a selected distance to define an opening having a central axis and provide a gap corresponding to approximately the thickness of the electrical wire. The central axes of the opening of each retention hook are positioned generally parallel to one another.

The base may include an elongated flat top surface and opposing side surfaces and ends. The side surfaces of the base may include downwardly depending legs.

In a preferred embodiment, the retention hooks are formed integral with the base.

The wire installation strip includes a hole spaced between at least two retention hooks for receiving a fastener to secure the base to the supporting structural element.

DETAILED DESCRIPTION OF THE PREFERRED EMBODIMENTS

In the following description, like reference characters designate like or corresponding parts. Also in the following description, it is to be understood that such terms as "downwardly," "upwardly," and the like, are words of convenience and are not to be construed as limiting terms apart from the invention as claimed.

Referring to the figures, there is shown a wire installation strip 10 in accordance with the present invention. The wire installation strip 10 is specifically designed to speed the installation of electrical wires 12. The wire installation strip 10 is particularly suited for the installation of insulated electrical wire of a type well known in the art. For example, suitable insulated electrical wire includes that sold under the trademark "Romex" of Rome Wire Company, Rome, N.Y.

The wire installation strip 10 includes a base 14 and a plurality of spaced retention hooks 16. The retention hooks 16 function to securely retain the electrical wire 12 against the base 14 and prevent the electrical wire from moving. In a preferred embodiment, the electrical wire 12 is retained transverse to the longitudinal length of the base 14.

The base 14 as shown in FIGS. 3–6 is generally elongated and includes a flat top surface 18 and opposing side surfaces 20. The flat top surface 18 of the base 14 may be of most any suitable length and width. For example, the base 14 may be lengthened or shortened to include most any number of connected retention hooks 16 as desired.

As shown in FIGS. 3–5, the side surfaces 20 of the base 14 may include downwardly depending longitudinally extending legs 22. The legs 22 act as a spacer and vibration absorber between the base 14 and a structural support element (not shown), e.g. a support joist and the like. The legs 22 also provide increased structural rigidity to the base 14 to provide a sturdy platform for the electrical wire 12 as the electrical wire spans between two or more wire installation strips 10.

The retention hooks 16 are preferably formed integral with the base 14. Although five retention hooks 16 are shown equally spaced along the longitudinal length of the base 14, it will be appreciated that most any number of retention hooks may be formed in the base as required.

Each retention hook 16 is a generally c-shaped member including a first leg 24 extending upwardly from the base 14 to a second leg 26 which extends over from the first leg parallel to the base. The second leg 26 is spaced from the base 14 a selected distance to define an opening 25 and provide a gap corresponding to approximately the thickness of the electrical wire 12 to securely retain the electrical wire against the top surface 18 of the base. The central axis of the opening 25 of each retention hook 16 positioned generally parallel to one another. In a preferred embodiment, the central axis of the opening is perpendicular to the longitudinal length of the base 14.

The second leg 26 includes a detent 28. The detent 28 is angled downwardly from an end of the second leg 26 and functions to capture and retain the electrical wire 12 against the first leg 24.

In a preferred embodiment, the interior surface of each retention hook 16 formed by the first leg 24, second leg 26 and detent 28 is sized and contoured to include angled interior top corners 30 to conform to the exterior top surface of the electrical wire 12 to be retained.

The retention hook 16 is preferably formed of a slightly resilient material such that when an electrical wire 12 is inserted between the detent 28 and the base 14, the distance between the detent and the base is increased until the electrical wire clears the detent and then the detent presses downward capturing the electrical wire within the confines of the retention hook. It will be appreciated that individual electrical wires 12 may be simply inserted or removed from the wire installation strips 10 without removing the wire installation strips from the supporting structural elements.

Spaced between at least two retention hooks 16 is a hole 32 for receiving a fastener 34 to secure the base 14 to a supporting structural element. In a preferred embodiment, a hole 32 is spaced intermediate every two retention hooks 16 so that the wire installation strip 10 can be shortened in the field if a shorter wire installation strip is required or if fewer retention hooks 16 are required. Most any type of fastener well known in the art, such as screws, nails and the like, may be used to secure the base 14 to the structural element.

The wire installation strip 10 is preferably formed as one-piece from most any suitable material well known in the art. In a preferred embodiment, the wire installation strip 10 may be formed of a suitable plastic material such as a thermoplastic or thermoset material using an extrusion or molding process as well known in the art. Suitable plastic materials include PE, PP, ABS, PVC, PVAC and the like. It will be appreciated that by forming the wire installation strip 10 from a plastic material the wire installation strip exhibits excellent weatherability and insulative properties and does not fray or wear the outer protective covering of the electrical wire 12 installed therein. As shown in a preferred embodiment (FIGS. 1-3), five retention hooks 16 are equally spaced along the longitudinal length of the base 14 of the wire installation strip 10.

Typically, the wire installation strips 10 in accordance with the present invention are first aligned and installed along the structural element using suitable fasteners as described above. Next, an electrical wire 12, such as a Romex electrical wire, is pressed against the top surface 18 of the base 14 between the retention hooks 16, forced sideways for insertion within the retention hooks of successively aligned wire installation strips until the electrical wire is strung to the desired location. The wire installation strips 10 provide a compact group of aligned electrical wires 12 thereby eliminating the need to individually staple each electrical wire. It will be appreciated that the electrical wires 12 may also be first installed in the wire installation strips 10 and then fastened on the supporting structural elements.

Having described presently preferred embodiments of the invention, it is to be understood that it may be otherwise embodied within the scope of the appended claims.

What is claimed is:

1. A wire installation strip for installing electrical wire, comprising:

a base having an elongated top surface and opposing side surfaces;

a plurality of retention hooks to retain the electrical wire, each retention hook including a first leg extending upwardly from said base, a second leg extending over from said first leg and parallel to the top surface of said base, and a detent angled downwardly from said second leg towards said base, said second leg spaced from said base a selected distance defining an opening having a central axis, said central axis of said opening of each retention hook positioned generally parallel to one another, wherein an electrical wire is captured and retained by said wire installation strip when the electrical wire is inserted into the opening of a retention hook, and wherein an interior surface of said retention hook formed by said first leg, said second leg and said detent is sized and contoured to include angled interior top corners to conform to an exterior top surface of the electrical wire.

2. The wire installation strip of claim 1 wherein said retention hooks are equally spaced along the length of said base.

3. The wire installation strip of claim 1 wherein said retention hooks are formed integral with said base.

4. The wire installation strip of claim 1 wherein said side surfaces of said base include downwardly depending legs.

5. The wire installation strip of claim 1 wherein said retention hooks are formed of a plastic material.

6. The wire installation strip of claim 1 further comprising a hole spaced between at least two said retention hooks for receiving a fastener to secure the base to a supporting structural element.

7. The wire installation strip of claim 1 further comprising a hole spaced intermediate two said retention hooks.

8. The wire installation strip of claim 1 wherein a plurality of holes are equally spaced along the longitudinal length of said elongated base.

9. A wire installation strip for installing electrical wire, comprising:

a base;

a plurality of retention hooks to retain the electrical wire, each retention hook including a first leg extending upwardly from said base, a second leg extending over from said first leg and parallel to said base, and a detent angled downwardly from said second leg towards said base, said second leg spaced from said base a selected distance defining an opening having a central axis, said central axis of each opening positioned generally parallel to one another, wherein an electrical wire is captured and retained by said wire installation strip when the electrical wire is inserted into the opening of a retention hook, and wherein an interior surface of said retention hook formed by said first leg, said second leg and said detent is sized and contoured to include angled interior top corners to conform to an exterior top surface of the electrical wire.

10. The wire installation strip of claim 9 wherein said retention hooks are equally spaced along the length of said elongated base.

11. The wire installation strip of claim 9 further comprising a hole spaced between two said retention hooks for receiving a fastener to secure the base to a supporting structural element.

12. The wire installation strip of claim 9 further comprising a hole spaced intermediate two said retention hooks.

13. The wire installation strip of claim 9 wherein said retention hooks are formed of a plastic material.

14. The wire installation strip of claim 9 wherein said base includes an elongated flat top surface and opposing side surfaces.

15. The wire installation strip of claim 14 wherein said side surfaces of said base include downwardly depending longitudinally extending legs.

16. The wire installation strip of claim 15 wherein a plurality of holes are equally spaced along the longitudinal length of said elongated base.

* * * * *